(12) United States Patent
Kochan

(10) Patent No.: US 6,779,487 B1
(45) Date of Patent: Aug. 24, 2004

(54) AUTOMATED FEEDER

(76) Inventor: Phillip Frederick Kochan, 18349 Tumalo Rsvr. Rd., Bend, OR (US) 97701

(*) Notice: Subject to any disclaimer, the term of this patent is extended or adjusted under 35 U.S.C. 154(b) by 0 days.

(21) Appl. No.: 10/359,672

(22) Filed: Feb. 4, 2003

(51) Int. Cl.[7] .................................................. A01K 5/02
(52) U.S. Cl. .................................. 119/51.11; 119/57.92
(58) Field of Search ............................. 119/57.11, 57.92, 119/58, 57.1, 51.01, 51.11–51.15, 60

(56) References Cited

U.S. PATENT DOCUMENTS

| | | |
|---|---|---|
| 245,795 A | 8/1881 | Dias |
| 461,457 A | 10/1891 | Terry et al. |
| 657,549 A | 9/1900 | Kiff |
| 1,442,382 A | 1/1923 | Bullock |
| 2,359,398 A | 10/1944 | Thompson et al. |
| 2,585,371 A | 2/1952 | Coffing |
| 2,711,217 A | 6/1955 | Gaty |
| 3,060,891 A | 10/1962 | Downs |
| 3,163,325 A | 12/1964 | Mihalek |
| 3,683,859 A | 8/1972 | Kirk |
| 3,752,358 A | 8/1973 | Ohno |
| 4,138,863 A | 2/1979 | Olson |
| 4,304,340 A | 12/1981 | Christian |
| 4,350,120 A | 9/1982 | Bittle |
| 4,665,863 A | 5/1987 | Toledo |
| 5,109,799 A | 5/1992 | Lader |
| 5,129,361 A | 7/1992 | Deutsh et al. |
| 5,345,893 A | 9/1994 | Morris |
| 5,447,120 A | 9/1995 | Eberhardt |
| 5,520,143 A | 5/1996 | Duin |
| 5,899,169 A * | 5/1999 | Jenson ..................... 119/51.13 |
| 6,405,674 B1 * | 6/2002 | Majewski et al. ......... 119/52.1 |

FOREIGN PATENT DOCUMENTS

| | | |
|---|---|---|
| DE | 444932 | 5/1927 |
| GB | 206577 | 11/1923 |
| GB | 1022504 | 11/1966 |

* cited by examiner

*Primary Examiner*—Son T. Nguyen

(57) ABSTRACT

An automated livestock feeder for storing and dispensing food such as hay or granular feed in a feed container, to an animal at predetermined intervals utilizes a tray control flange which releases a feed tray on which feed sets. At a predetermined feeding time a motor rotates the flanged latch thereby releasing the tray to rotate from a storage position to a dispense position. The invention generally comprises a housing containing a feed tray supported by the housing defining a compartment for supporting and protecting feed, and a tray control flange for supporting each feed tray. The activation mechanism includes an electrical power source, a timer relay/mechanical switch, and an electrical motor.

7 Claims, 5 Drawing Sheets

AUTOMATED FEEDER

TECHNICAL FIELD

This invention relates to an automated livestock feeder, particularly, to a device wherein a feed supporting tray is tripped and allowed to fall by means of gravity after being released by a rotating tray control flange.

BACKGROUND OF THE INVENTION

Horses and other livestock living in a natural setting tend to graze for 15 or more hours in a 24 hour period. Therefore, for optimum health, horses and other domestic livestock which are not on pasture should be fed several times per day, at regular intervals and at regular times each day. However, feeding this often and on a regular schedule can be difficult for an owner due to work schedules, sickness, emergencies, vacations away from home, or inclement weather. Although it is envisaged that the invention could be used to feed other animals, it will be specifically described in relation to horses.

Therefore, there is an ongoing need for an automated feeder which reliably dispenses pre-measured quantities of grain and/or flake hay at predetermined times.

SUMMARY OF THE INVENTION

The illustrated invention is an automated livestock feeder for storing and dispensing food such as hay or granular feed such as grain, in a flexible rounded feed container, to an animal at predetermined intervals. The invention utilizes a feed tray control flange on which a feed tray supporting the hay or granular feed in a flexible rounded feed container sets. At a predetermined feeding time a motor rotates the flanged latch to release the tray, which rotates on its hinges and dispenses the feed.

The invention generally comprises a housing and one or more upper housings stacked contiguously on top of the housing. Each housing and all upper housings contain a feed tray having a rear edge hinged to the side walls and a front edge terminating in proximity to the front wall.

The housing and all upper housings also contain a motor housing attached to the middle of the front wall with a roof slanted at a sufficient angle to prevent hay or a rounded feed container suitable for holding granular feed from catching on the motor housing. Each motor housing contains a motor connected to a tray control flange which is supported by the motor housing and which, in turn, supports the feed tray in the first, horizontal storage position, and which, when rotated by the motor to the second, slanted dispense position, releases the feed tray. The motor is electrically connected to an energy source through a timer relay/mechanical switch.

When an owner wishes to reset and then refill the automated feeder they activate the mechanical switch and lift the feed tray from its slanted dispensing position to its horizontal storage position and release the mechanical switch when the tray control flange is in a position which supports the feed tray in its horizontal storage position. The feed tray also has one or more compressible sound deadening pads mounted underneath the feed tray in proximity to the housing front wall.

The automated feeder can have a removable door which fits into the open space at the back opening of the housing and/or upper housings. The door has door tabs which extend from the sides of the door and fit into corresponding door hanging slots in the sides of the housing and/or upper housing which are aligned with the door tabs. A door lock is rotatably mounted directly above any of the door tabs in a horizontal slit. The door lock is moveable between a first position in which the door lock prevents the door from being raised from the downward bending portion of the door hanging slot, and a second position in which said door lock does not impeded the door from being raised and therefore, removed.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
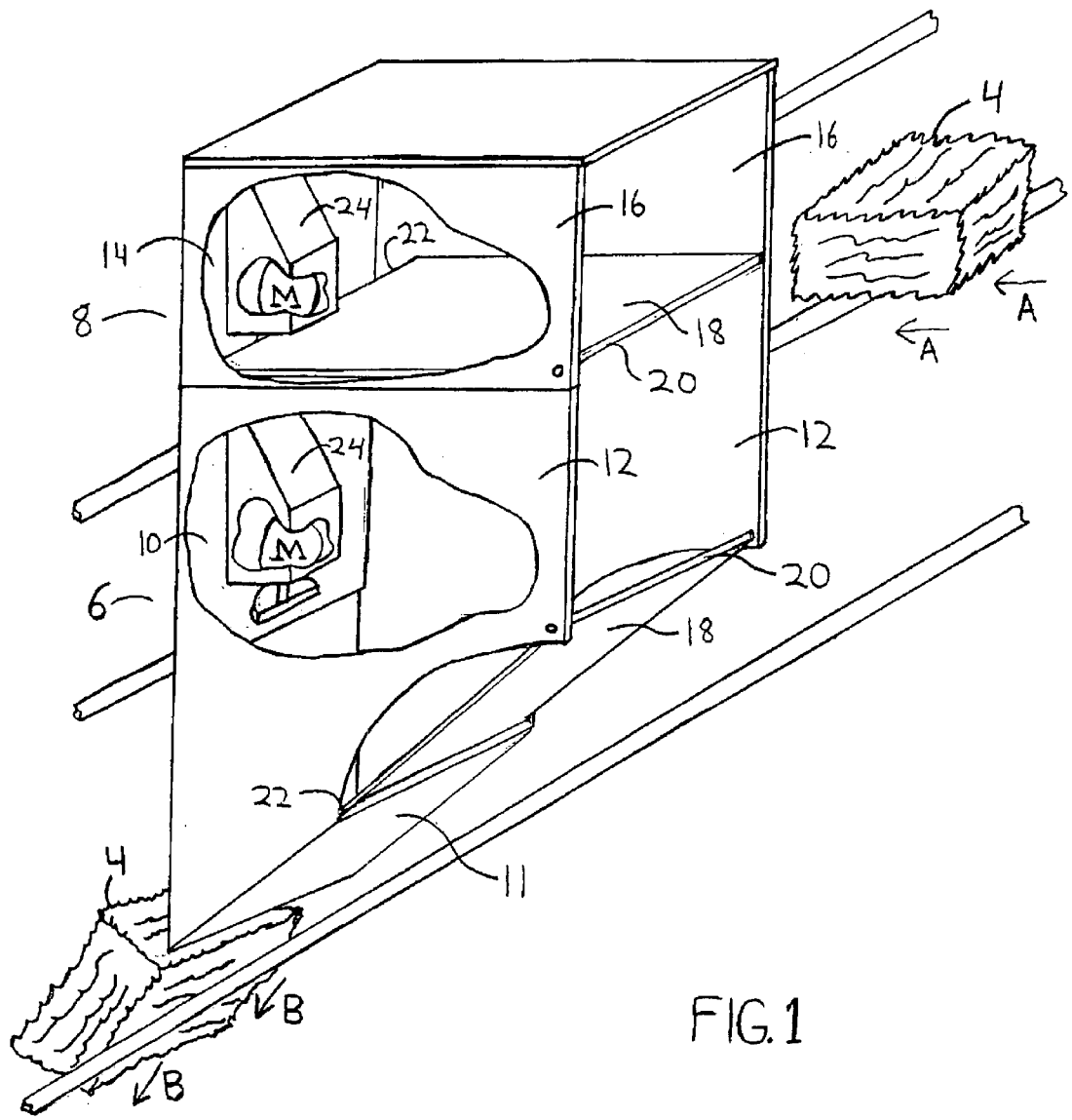
FIG. 1 is an elevated perspective view of an exemplary embodiment of the invention mounted on a stock panel and showing the feed housing and motor housing partially cut away to expose interior parts.

The invention described herein and shown in the drawings is referred to generally as an automated feeder 2. Although the invention is sometimes specifically described with reference to its use to feed horses, the invention is not limited to such use and instead may be used with many kinds of livestock. Nonetheless, feeding of horses tends to present some unique needs, and therefore, describing the invention with respect to its use with horses aids in illustrating certain features of the invention. Thus, the illustrated automated feeder 2 possesses certain desirable characteristics that are illustrated by the needs of horses and horse owners.

Since horse owners tend to be very visually oriented, kinesthetic, and non-mechanically inclined they tend to distrust complex mechanical devices with hidden moving parts. Therefore, at each loading an automated feeder must provide visual and tactile feedback giving unambiguous and direct verification that the latching device is properly latched, in perfect working condition, that the timer switch is working, and that the unit is energized with electrical power. In order to provide all of these features, the action or motion of resetting the latching mechanism must be as similar as possible, and preferably identical, to the releasing motion. Also, the latching mechanism must be completely visible to the owner.

The latch mechanism must also have the absolute minimum number of moving parts and be made up of the minimum number of individually machined or shaped parts, with the minimum being one in both cases.

For maximum initial benefit for the least initial cost an owner must be able to purchase an automated feeder as a single feeding unit and easily add more feedings to that base unit as confidence in the usefulness and practicality of the feeder increases. In other words, it is unattractive to a customer to have to pay for a multiple feeding unit when they have never used an automated feeder and have no proof as to the benefits of using one.

Horses can be kept in a barn which often times includes a row of stalls connected via an isle way. Therefore, an automated feeder needs to be mountable on the exterior wall of a stall, allow the feed to be dispensed through the wall and into a stall, and leave room for horses and humans to use the isle way.

Horses are fed hay and/or granular feed such as grain in all combinations. Therefore, an automated feeder needs to be able to dispense hay and/or granular feed such as grain in any combination.

Domesticated horses are incredibly strong, extremely agile, and extraordinarily mischievous animals. Therefore, an automated feeder must be able to be mounted outside the horse's pen or stall so they cannot fall on it, knock it over, impale themselves on a corner of it, or kick it.

The feeder must also be as easy as possible to install. Therefore, when scaled to a size allowing a typical flake of hay or rounded feed container suitable for holding a typical amount of granular feed, and built from a readily available and inexpensive yet durable material, must be small and light enough that a single person with average upper body strength can lift and mount it.

For feeders with the above mentioned characteristics the shipping cost is a considerable part of the total cost of an automated feeder. Therefore, the feeder must be able to be packaged and shipped in a box small enough to be delivered by standardized, worldwide shipping companies with no added surcharges.

Horses are kept in barns and covered areas as well as outside. Some owners may prefer a door to protect the feed from the elements or other horses in a barn isle way. Some owners may never need to fully enclose their feed and need not pay for a door they will never use. Also, in one season a horse owner may want to completely enclose their feed, while in a dryer or warmer season a door becomes a nuisance. Therefore, an automated feeder must have an easily removable door for situations where the owner determines a door is not needed.

Horses and humans often spook or startle when loud and/or sudden motions occur. In the wrong situation a horse or its owner could get seriously hurt when an automated feeder goes off. Also, in crowed barns, groups of people will be in close proximity to several or more feeders thereby increasing the chance of injury. Therefore, the feeder must make a small audible warning sound a few seconds prior to dispensing the feed. Feeders with single shot linear actuators such as a solenoid should be avoided since they not only actuate very suddenly, but also are quite loud.

With specific reference now to the drawings, FIG. 1 is an elevated perspective view of an exemplary embodiment of the automated feeder, denoted generally as 2. The automated feeder 2 stores and dispenses food, such as hay 4, to an animal at predetermined intervals.

With respect to the common components of FIG. 1: automated feeder 2 generally comprises a main housing 6 and a plurality of upper housings 8 stacked contiguously on top of the main housing 6. In FIG. 1, only one upper housing 8 is shown. While the invention is described herein with only one upper housing, it will be understood that the invention may be used with any number of upper housings 8, and with the main housing 6 by itself without any upper housing.

The main housing 6 consists of a rectangular front wall 10 and two side walls 12 with side walls 12 extending below the bottom of the front wall 10. The bottom edges of the side walls 12 are slanted downwards towards the front of the automated feeder 2 and a rectangular chute 11 connects the bottom edges of the side walls 12. Each upper housing 8 consists of a rectangular upper front wall 14 and two rectangular upper side walls 16 which are the same height as the upper front wall 14.

The main housing 6 contains a feed tray 18 having a rear edge 20 hinged at the outer lateral edges thereof, as shown, to the side walls 12. Feed tray 18 has a front edge 22 that terminates in the interior of main housing 6 in proximity to the front wall 10. Each upper housing 8 also contains a feed tray 18 hinged to the upper side walls 16 at the outer lateral edges of rear edge 20, and a front edge 22 terminating in the interior of the housing in proximity to the upper front wall 14.

The main housing 6 contains a motor housing 24 attached to the inside middle of the front wall 10 with a roof slanted at a sufficient angle to prevent hay 4 or a rounded feed container suitable for holding granular feed from catching on the motor housing 24. Each upper housing 8 also contains a motor housing 24 attached to the inside middle of the front wall with a roof slanted at a sufficient angle to prevent hay 4 or a rounded feed container suitable for holding granular feed from catching on motor housing 24.

Each motor housing 24 contained in the main housing 6 and each upper housing 8 contains a clockwise or counter-clockwise rotating motor denoted by the letter "M".

As described below, each feed tray 18 is pivotable about the hinged attachment to the side walls between a storage position in which the feed tray is generally horizontal, and a dispense position in which the feed tray pivots downwardly so that feed held on the tray is dispensed to an animal. In FIG. 1, the feed tray 18 contained in the upper housing 8 is shown in the storage position while the feed tray 18 contained in the main housing 6 is shown in the dispense position. In FIG. 1, hay 4 is shown being inserted in the direction shown by arrows A into the back of the upper housing 8 where it will rest on the feed tray 18 which is in the storage position. When the feed tray 18 falls to the dispense position (as shown with arrows B in FIG. 1 for the tray 18 contained in the main housing 6) the hay 4 falls out the front of the automated feeder 2.

Figure 2:
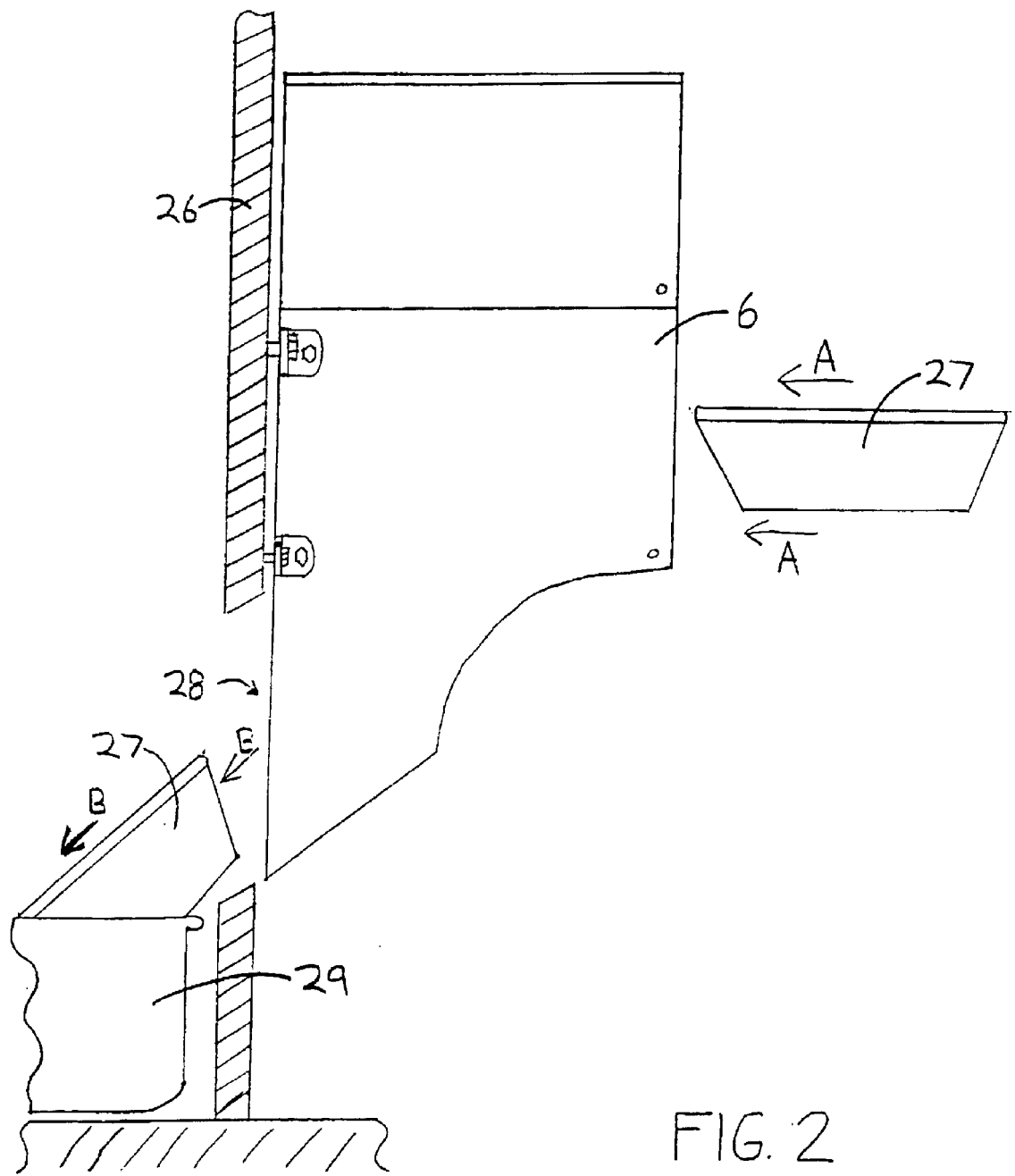
FIG. 2 is a side elevation view of an exemplary embodiment of the invention mounted on the wall of a stall, which is shown in cross section.

FIG. 2 shows a side view of an exemplary embodiment of the automated feeder 2 mounted on a stall wall 26. The stall wall 26 has a wall cutout 28 allowing hay (not shown) or a granular feed container 27 to be dispensed inside the stall and into a waiting feed trough 29. FIG. 2 also shows the insertion or loading direction of a feed container 27 into the main housing 6 (arrows A), and another feed container 27 being dispensed through the wall cutout 28 (arrows B).

Figure 3A:
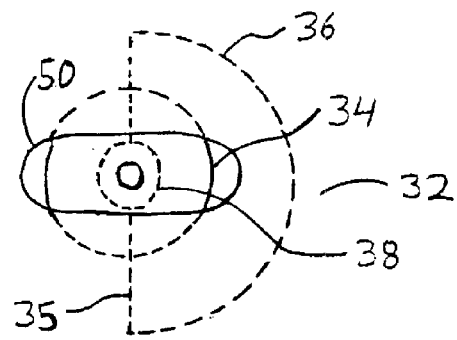
FIG. 3A is a detailed drawing of a top view of the tray control flange as viewed from inside the motor housing.
Figure 3:
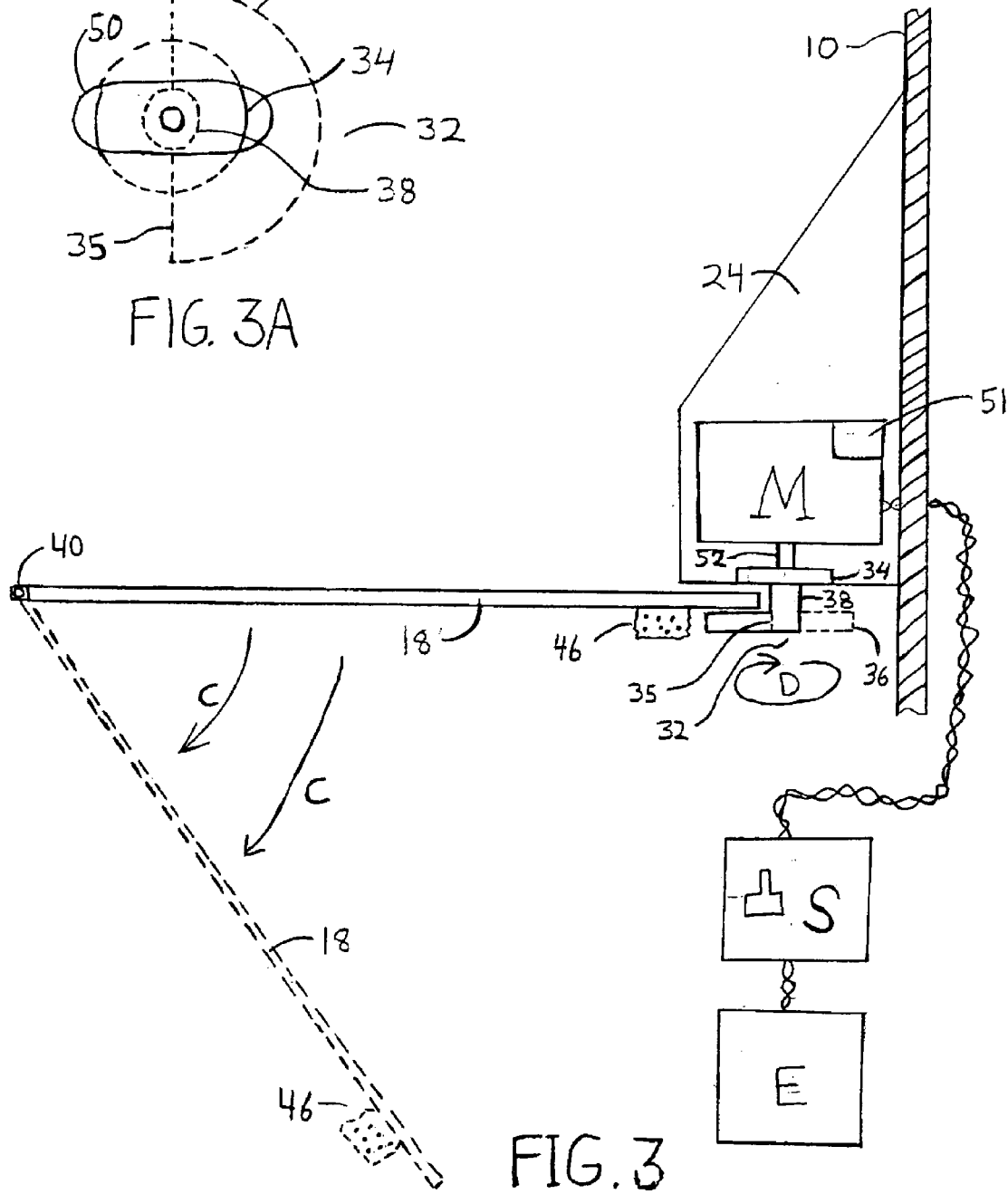
FIG. 3 is a detailed drawing of a side elevation view of the tray control flange, supporting motor housing, and feed tray.

FIG. 3 shows the tray control flange 32 supported by a motor housing 24 mounted on the front wall 10 viewed from the side, but with the near side wall removed and the near wall of the motor housing removed to expose the interior components. Also shown in FIG. 3 is a feed tray 18 shown in solid lines in its horizontal storage position and dashed in its slanted dispensing position. The feed tray 18 which is shown solid in its storage position, is supported by the tray control flange 32. Feed tray 18 is pivoted about hinges 40 between the storage position and the dispense position, as illustrated by arrows C.

The tray control flange 32 has two flanges, the upper flange 34 is fully circular and of smaller diameter than the lower flange 36. The upper flange 34 and lower flange 36 are connected at right angles by a cylindrical shaft 38. The lower flange 36 is flattened on one side with the plane defined by said flattened side 35 tangential with the cylindrical shaft 38. In the storage position, the tray control flange 32 is oriented such that the lower flange 36 supports the feed tray 18 in its horizontal storage position. In this horizontal storage position the feed tray 18 may support a quantity of hay or feed container.

When the tray control flange 32 is rotated such that the flattened side 35 of the lower flange 36 is parallel with and closest to the front of the feed tray 18, the lower flange 36 no longer supports the front of the feed tray 18 thereby allowing the feed tray 18 to rotate on its hinges 40 to its dispensing position (shown dashed). This dispensing position for the lower flange 36 is also shown dashed. The tray control flange 32 is coupled to a motor denoted by the letter "M" which is electrically connected to an energy source denoted by the letter "E" through a timer relay/mechanical switch denoted by the letter "T". When the motor "M" is energized either by the timer relay/mechanical switch "T" the tray control flange 32 rotates as shown by arrow D in FIG. 3. Although only one switch "T" is shown in FIG. 3, it will be appreciated that in a preferred embodiment there is a timer switch associated with each motor. Thus, in the case where plural upper housings 8 are being used, there will be a motor for each housing and a switch for each motor.

There is an activation alarm 51 associated with each motor M, as shown schematically in FIG. 3. The activation alarm 51 provides an audible warning signal a few seconds prior the time when the motor is activated. The purpose of the warning signal is to provide the livestock with an audible indication that feed is about to be dispensed; over time, the livestock will be imprinted with a behavioral understanding that when the alarm 51 sounds, feed is about to be dispensed. In addition, when the alarm sounds, the animal will be prepared for the relatively louder sound that is about to occur as a result of the feed tray 18 dropping into the dispense position. Activation alarm 51 can take many forms, the simplest of which is simply the sound of motor M as it is activated. Some motors are loud enough that a separate activation alarm is unnecessary, since the time between activation of the motor and the time when the flange is rotated into the position where the tray is released is long enough that a sufficient warning signal is sounded. Alternately, a separate activation alarm 51 may be connected to the timer T and set to sound an alarm signal a few seconds prior to activation of the motor. The activation alarm may be any sound-generating device, but preferably is a device that generates a non-threatening audible signal.

When an owner wishes to reset and then refill the automated feeder 2 they manually activate the relay timer/mechanical switch "T" and lift the feed tray 18 from its slanted dispensing position (shown dashed) to its horizontal storage position (shown solid) and release the relay timer/mechanical switch "T" when the lower flange 36 is in a position which can support the feed tray 18 in its horizontal storage position.

The feed tray 18 also has one or more compressible sound deadening pads 46 mounted underneath the feed tray 18 in proximity to the housing front wall 10.

FIG. 3A shows a top view of the tray control flange 32 as viewed from inside the motor housing 24. This view shows an oblong hole 50 in the motor housing 24. This oblong hole 50 allows the upper flange 34 to be inserted into the motor housing 24 when the axis of the tray control flange 32 is tilted from the vertical, yet disallowing removal when the axis is vertical. The upper flange 34 rests on the narrow edges of the oblong hole and thereby transfers vertical forces caused by the weight of the tray control flange 32 and supported feed tray 18, to the motor housing 24, and not the motor shaft 52, thereby avoiding wear on the motor "M".

Figure 4:
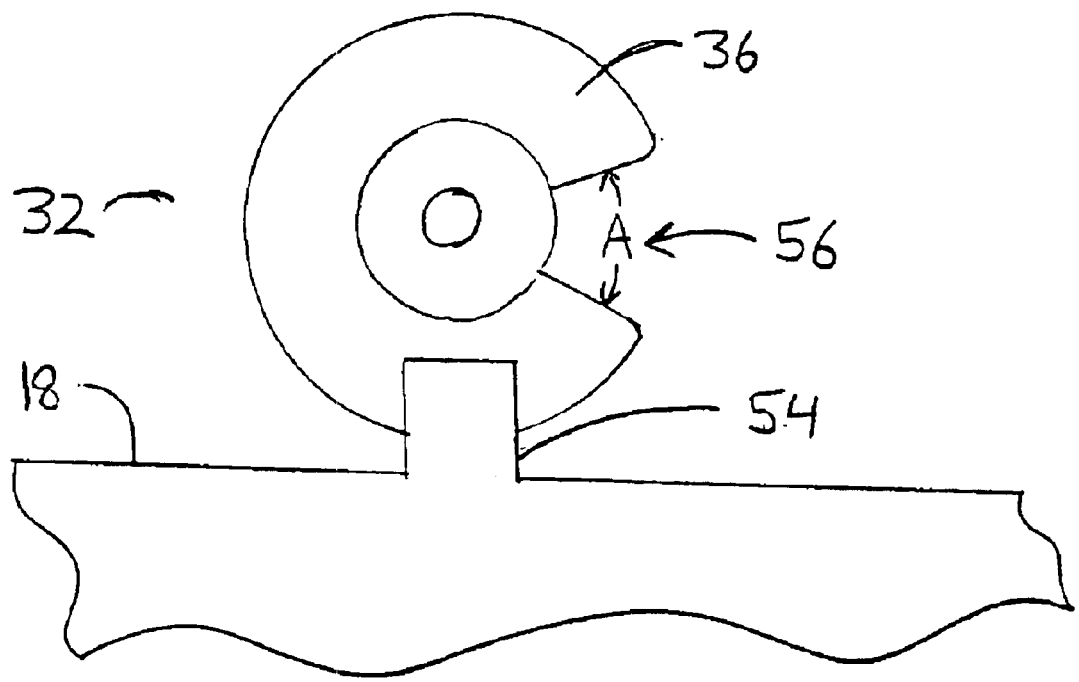
FIG. 4 is a detailed drawing of a top view of an alternative embodiment of the tray control flange and its corresponding feed tray.

Turning now to FIG. 4, which illustrates an alternate embodiment of the tray control flange 32 and feed tray 18. In this embodiment the feed tray 18 has a tray tab 54 which is shown as a rectangle and protrudes from the feed tray 18. The lower flange 36 could be notched or cut out at any angle "A" which is wide enough to allow the tray tab 54 to fall through the lower flange notch 56. The angle "A" of the lower flange notch 56, could even be very near, but less than 360 degrees, in which case the lower flange 36 would become a rod or bar. The tray tab 54 is shown as a rectangle but it could be any shape such as triangular, rounded, or even a rod attached to the bottom of or embedded into the feed tray 18.

Figure 5:
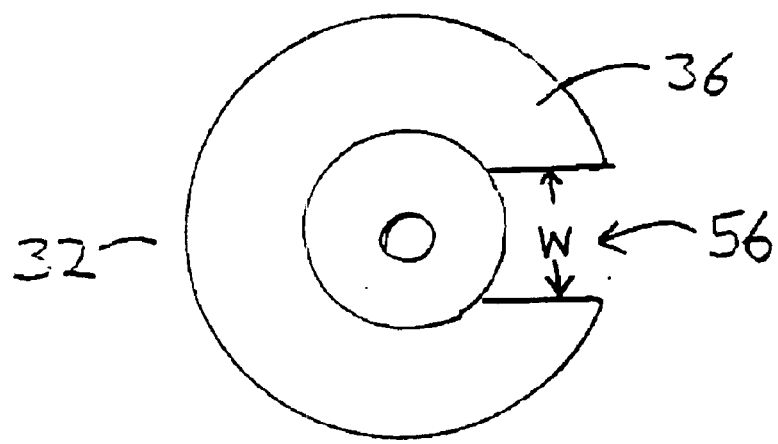
FIG. 5 is a detailed drawing of a top view of yet another alternative embodiment of the tray control flange.

Turning now to FIG. 5, which illustrates an alternate embodiment of the tray control flange 32. In this embodiment the lower flange 26 could be notched such that the sides are parallel and could have any width "W" less than or equal to the diameter of the lower flange 36.

While three different embodiments of a tray control flange have been illustrated, it will be appreciated that there are numerous structural configurations in which the lower flange and the tray have complementary geometric shapes that allow the tray to be released when the flange rotates to a predetermined position. Those illustrated are intended as examples only of the many available configurations.

In use, feed is inserted onto feed tray 18 of main housing 6, and also onto each feed tray 18 of additional upper housings 8 that are being used. The user sets each timer/mechanical switch "T" for each feed tray 18, so that each feed tray 18 is dispensed as described above at a desired time. The desired time for each timer/mechanical switches "T" is set such that the feed tray 18 of main housing 6 is dispensed first and each additional upper housing 8 is dispensed sequentially at predetermined, desired intervals, moving upwardly from the main housing 6 to the next upwardly adjacent upper housing 8, and so on.

In an alternative embodiment a single timer/mechanical switch "T" can control all of the feed tray(s) 18. In this embodiment, the timer/mechanical switch "T" is set so that the feed tray 18 of the main housing 6 dispenses first and each additional upper housing 8 is dispensed sequentially at predetermined, desired intervals, moving upwardly from the main housing 6 to the next upwardly adjacent upper housing 8, and so on. In this regard the timer/mechanical switch "T" defines a control mechanism that controls operation of each motor "M" so that feed is dispensed at the desired intervals. When a single timer/mechanical switch is used, the timer/mechanical switch "T" is a controller that is capable of activating plural motors at predetermined intervals—so, for example, a 5 unit feeder could have all five trays loaded and the controller would be set to dispense each one at a desired, predetermined time. As indicated above, activation alarm 51 provides an audible warning signal a few seconds prior to the time when one of the motors moves its flange to the position where the associated tray 18 drops into the dispense position. Although the sound deadening pads 46 reduce the "clunk" that is produced when the tray 18 drops into the dispense position, the warning sound generated by the activation alarm 51 provides the livestock with an advance signal that something is going to happen. This helps decrease the chances of spooking the animal.

Figure 6:
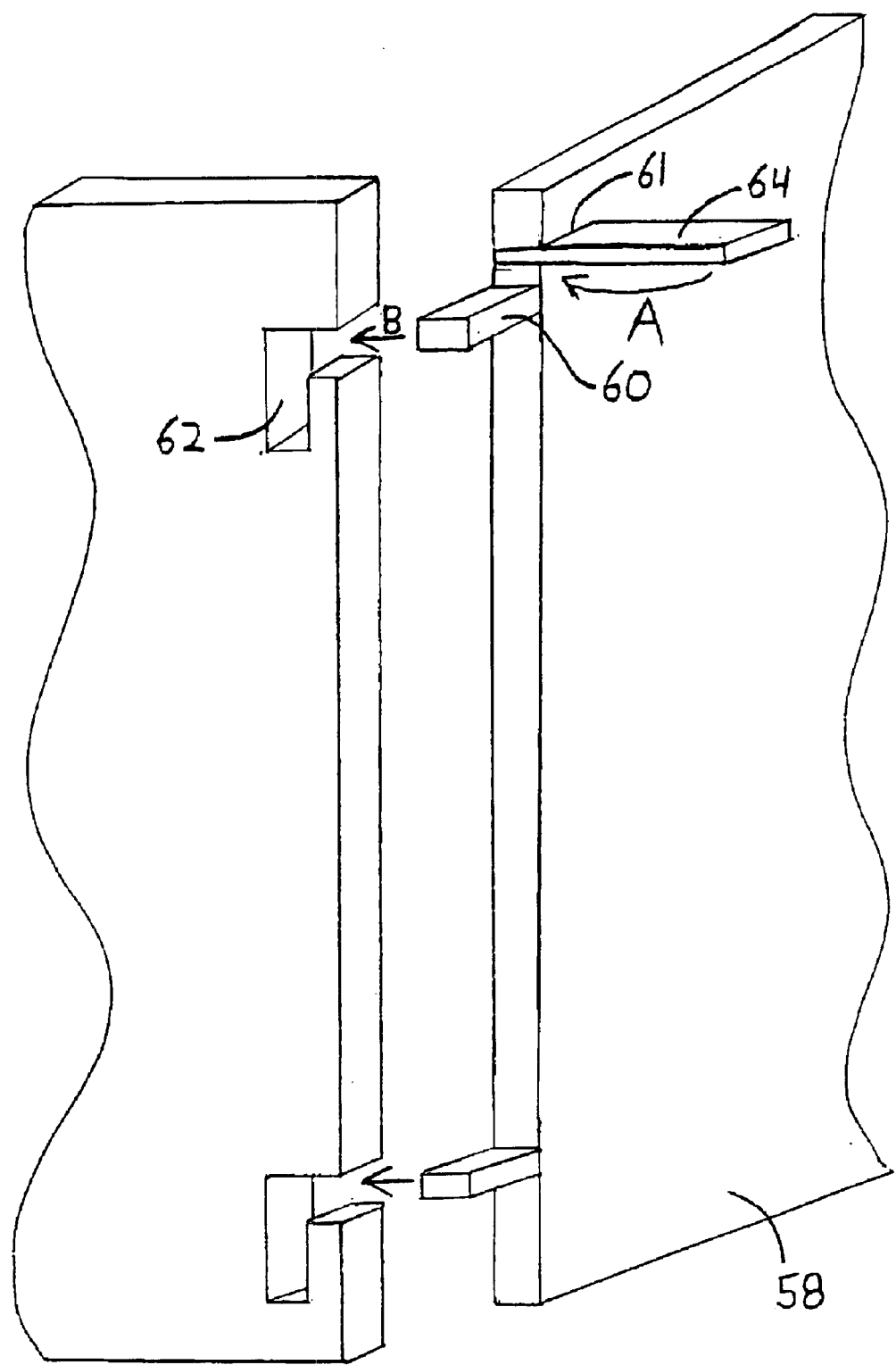
FIG. 6 is a detailed drawing with an elevated perspective view of the removable door, door tabs, and door hanging slots.

Turning now to FIG. 6, which illustrates a removable door 58 which fits between the two side walls 12 or the two upper side walls 16 at the back opening of the main housing 6 or upper housing 8, respectively. The door 58 has two door tabs 60 which extend from the sides of the door 58. The side walls 12 and/or upper side walls 16 have corresponding door hanging slots 62 aligned with the door tabs 60 allowing insertion of the door tabs 60. Mounted directly above the door tab 60 is a door lock 64 which is rotatably mounted about one end in a horizontal slit 61 located above the upper door tab 60 and moveable between a first position in which the door lock 64 prevents the door 58 from being raised from the downward bending portion of the door hanging slot and a second position in which said door lock does not impeded the door 58 from being raised and therefore, removed. The locking direction of movement of the door lock 64 is shown by arrow A. The insertion direction of movement of the door tab 60 is shown by arrow B.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

What is claimed is:

1. An automated feeder, comprising:

a housing having a rectangular front wall and two rectangular side walls;

a feed tray having a rear edge hinged to the housing side walls and a front edge terminating in proximity to the housing front wall;

a tray control flange rotatably mounted in proximity to the housing front wall and movable between a flange first position in which the flange supports the feed tray in a storage position and a flange second position in which the flange releases the tray so that the tray pivots about the hinge to a dispense position;

said feed tray control flange comprising:

two flanges connected at right angles by a vertically oriented cylindrical shaft with upper flange circular and lower flange partially circular and flattened on one side with flattened side tangential with said cylindrical shaft such that when the flattened side is parallel with and farthest away from the front of said feed tray said lower flange supports the free end of said feed tray and when the flattened side is parallel with and closest to the free end of said feed tray said lower flange does not support said feed tray;

said feed tray control flange supported at inner edge of said upper flange by a motor housing attached to said front wall comprising:

irregularly shaped hole in bottom allowing insertion of said upper flange of said rotating flanged shaft when axis is tilted from the vertical yet disallowing removal when axis is vertical thus allowing axial forces placed on said tray control flange to be transferred to the motor housing;

roof slanted at a sufficient angle to prevent a flake of hay or rounded feed container suitable for holding granular feed from catching on motor housing;

a motor operable to rotate the flange between the first and second positions.

2. The device of claim 1 further including a timer relay/mechanical switch electrically connected in series with said motor for activating said electrical motor at a predetermined time.

3. The device of claim 1 further including a chute connected to said side walls in a position to support said feed tray in a dispense position allowing feed to slide downwardly on said chute.

4. The device of claim 1 further including a removable door which fits between said side walls with 1 or more door tabs extending from each side;

wherein said side walls have downward bending door hanging slots with openings aligned with said door tabs allowing horizontal and then downward insertion of said door tabs for securing of said door;

further including one or more door locks rotatably mounted about one end in a horizontal slit located above one or more door tabs and moveable between a first position in which said door lock prevents said door from being raised from the downward bending portion of the door hanging slot and a second position in which said door lock allows said door to be raised and removed.

5. The device of claim 1 further including one or more compressible pads mounted underneath said feed tray in proximity to the housing front wall.

6. The device of claim 1 further including one or more upper housings, each defining an enclosed space having an upper front wall and two upper side walls stacked contiguously on top of said housing with each of said upper housings comprising:

an upper feed tray having a rear edge hinged to said upper housing side walls and a front edge terminating in proximity to said upper housing front wall;

an upper tray control flange rotatably mounted in proximity to the housing front wall and movable between a flange first position in which the flange supports the feed tray in a storage position and a flange second position in which the flange releases the tray so that the tray pivots about the hinge to a dispense position;

a motor operable to rotate the flange between the first and second positions.

7. The device of claim 6 further including a timer relay/mechanical switch electrically connected in series with said motor for activating said electrical motor at a predetermined time.

* * * * *